March 24, 1959  P. G. HUGHES  2,878,580
CONTROL SYSTEM FOR CLOTHES DRYERS
Filed April 4, 1957  3 Sheets-Sheet 1

INVENTOR.
PHILIP G. HUGHES
BY *H. F. Manbeck, Jr.*
HIS ATTORNEY

March 24, 1959     P. G. HUGHES     2,878,580
CONTROL SYSTEM FOR CLOTHES DRYERS
Filed April 4, 1957     3 Sheets-Sheet 2

INVENTOR.
PHILIP G. HUGHES
BY *H. F. Manbeck, Jr.*
HIS ATTORNEY

March 24, 1959  P. G. HUGHES  2,878,580
CONTROL SYSTEM FOR CLOTHES DRYERS
Filed April 4, 1957  3 Sheets-Sheet 3

INVENTOR.
PHILIP G. HUGHES
BY H. F. Manbeck, Jr.
HIS ATTORNEY

# United States Patent Office 2,878,580
Patented Mar. 24, 1959

2,878,580

CONTROL SYSTEM FOR CLOTHES DRYERS

Philip G. Hughes, Anchorage, Ky., assignor to General Electric Company, a corporation of New York Application April 4, 1957, Serial No. 650,789

5 Claims. (Cl. 34—45)

My invention relates to clothes drying machines and more particularly to automatic control systems for use in such machines for controlling the drying operation.

In one type of automatic control system which is used in domestic clothes drying machines, the drying operation is controlled by the combined functioning of a control thermostat and a timer motor. The control thermostat operates a pair of switches, a timer motor switch and a heater switch, which control respectively the timer motor and the main heater of the dryer during the drying operation. The two switches are operated inversely by the thermostat so that the timer motor is never in operation while the heater is energized, and, vice versa, the heater is de-energized while the timer motor is in operation. The trip point or upper operating temperature of the thermostat is so chosen that the heater is de-energized only when the clothes in the machine have dried to a considerable extent. The timer motor thus remains inoperative for the greater portion of the drying cycle. When the timer motor is energized, however, it turns toward an "off" position and when it reaches that position, it terminates the dryer operation.

In this control system the trip point of the thermostat is preferably chosen so that when it is reached, a load of light synthetic fabrics will be almost completely dry. For such fabrics the timer motor may therefore be preset so that the timer operates for only a very brief period, turning the machine "off" almost immediately. However, other types of fabrics will not shed moisture as quickly as the light synthetic fabrics and need a longer drying period. For example, cottons and linens which form the greater part of most domestic loads need a somewhat longer drying time than synthetics, and very heavy articles such as bedspreads, shag rugs, dungarees, overalls, etc., shed moisture very slowly and need a still longer drying time than cottons and linens. In the above control system the increased increment of drying time needed for these medium and heavy loads is taken care of by the setting of the timer motor. In other words for a medium load the timer motor is set to run for a longer time than for a synthetic load, and for a heavy load to run even longer than for a medium load. The system thus provides for efficiently and correctly drying all types of fabrics with only a minimum of operator judgment being required; only the timer motor need be set by the operator and that setting is really governed by the type of fabrics being dried.

It will be noted though that the timer motor will not ordinarily run continuously at its medium or heavy load settings until it turns the machine off. As the timer runs, the machine is, of course, cooling due to the de-energization of the heater, and in order to maintain a suitable drying temperature the thermostat will normally re-set before the timer reaches its "off" position. Specifically, when the machine temperature falls to a certain level, the thermostat re-energizes the heater to heat the machine up again and concurrently de-energizes the timer motor. This non-timed heating continues until the thermostat trips again, once more energizing the timer motor and de-energizing the heater, whereupon the timer motor again commences operation. Depending upon the time that the timer is set for, it may then turn the machine off, but at its longer settings, the same sequence or inverse cycling of the timer motor and the heater may occur several times before the drying operation is finally terminated. But in any case, however long the operation continues, the inverse cycling keeps the dryer temperature at the same level or range for drying the clothes.

My invention is directed particularly to an improvement in this type of control system whereby the length of time required to dry the medium and heavy types of fabric types may be shortened appreciably. In particular, I have found that with this type of control system the drying time required for the medium and heavy loads may be substantially shortened if the temperature of the dryer is increased during the period that the heater and the timer motor are cycled inversely by the thermostat. The higher temperature causes a more rapid rate of moisture removal or extraction from the clothes, and the clothes are not damaged in any way since by their very structure they are able to stand higher temperatures than the synthetic fabrics which control the original trip point of the thermostat.

Accordingly, it is a primary object of my invention to provide a new and improved control system of the above type, which provides for gradually raising the drying temperature during the cycling period of the heater and the timer motor thereby to shorten the required drying time.

It is a more specific object of my invention to provide such a control system in which the temperature rise is effected by automatically adjusting the operating point of the main control thermostat.

Still another object of my invention is to provide an improved control of this type, which in addition to including my novel means for shortening the drying time also includes means for adjusting the operating temperature range of the dryer in accordance with the ambient or room temperature thereby to obtain the same drying effect at all ambient temperatures.

In carrying out my invention in one form thereof, I provide a clothes dryer having suitable clothes tumbling means and a heater for supplying heat to extract moisture from the clothes being tumbled. For controlling the dryer I intercorporate within it a control system which includes a timer motor and a main control thermostat. The control thermostat operates a heater switch and a timer motor switch, which control respectively the operation of the heater and the timer motor during the timer operation. The thermostat opens the heater switch and closes the timer switch at a relative high temperature within the dryer, and closes the heater switch and opens the timer switch at a lower temperature within the dryer. With the basic arrangement, as pointed out above, the timer motor is not placed in operation until the dryer has reached a temperature at which the clothes are substantially dried, and the varying increment of time needed thereafter to complete the drying operation for the various types of loads may be controlled by the setting of the timer motor. The timer motor, of course, operates suitable switch means which terminates the dryer operation when it has run for the preset time.

In order to reduce the drying time needed after the control thermostat has tripped for the first time, I provide new and improved means in this system, which thereafter modify the actuation of the heater and timer motor switches by the thermostat. This means comprises an auxiliary thermostatic means and a heating means associated with it. The auxiliary thermostatic means is arranged to change the operating relationship between the control thermostat and the switches, and when the heating means is energized, the relationship is so changed that a higher temperature is required in the dryer before the control thermostat is effective to operate the switches. The thermostat heating means is energized by a circuit controlled by one of the timer motor and heater switches so that it is energized concurrently with the timer motor and inversely with the heater. Thus, the longer the timer motor runs, i.e., the more times it is cycled on and off inversely with the heater, the higher is the temperature required for the control thermostat to operate the switches and the higher is the temperature maintained within the dryer. This higher temperature results in the fabrics being dried much faster than if the temperature remained constant, and thereby my improved control system provides a much more satisfactory drying operation. It will be noted that since the heating means for the auxiliary thermostat is not energized until the timer motor is energized, it does not effect the initial trip point of the thermostat, and thus for light synthetic loads has no effect on the dryer temperature. The light synthetic loads are therefore not subjected to temperatures which might be unsafe for them.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings in which:

Figure 1:
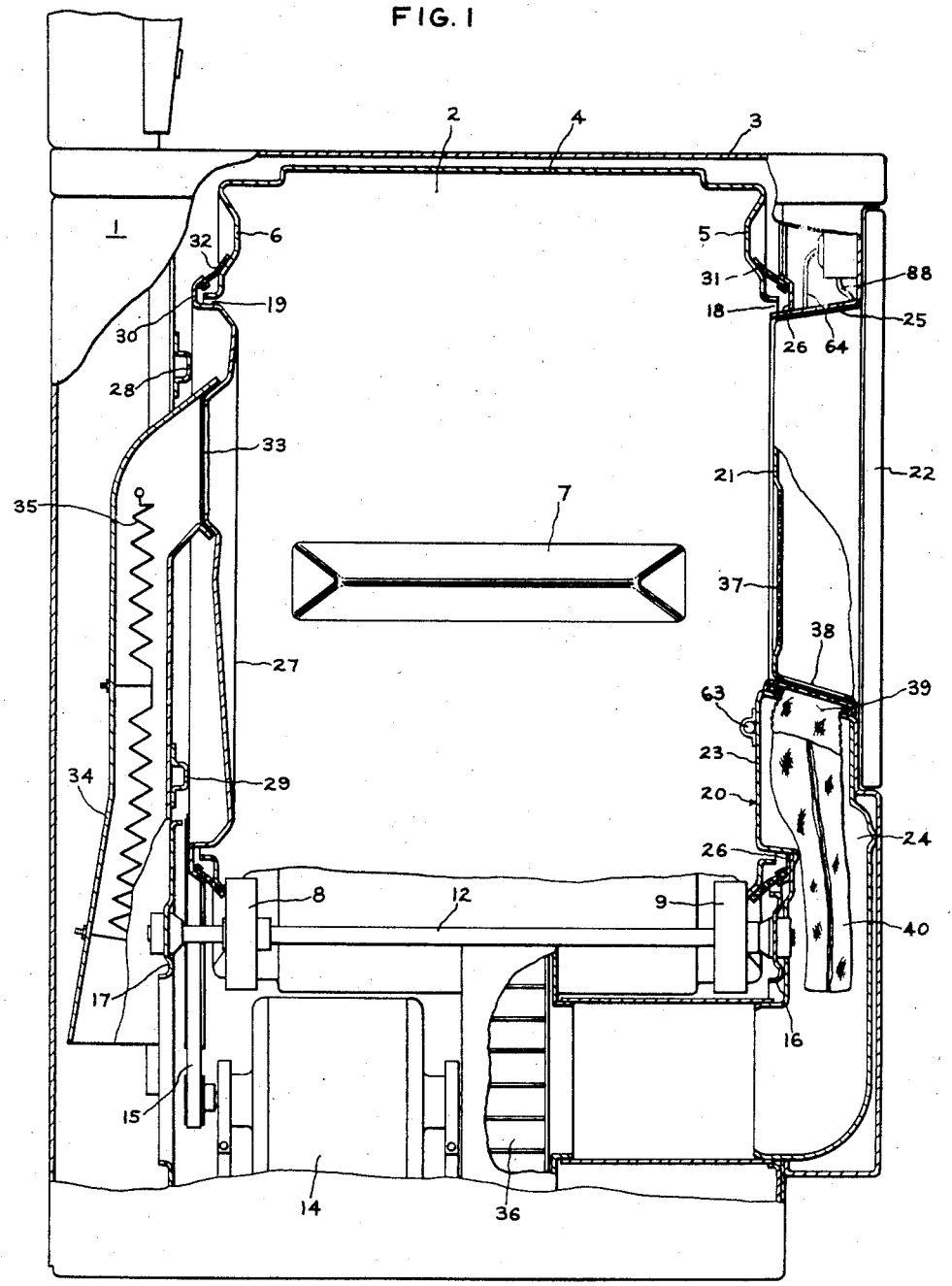
Fig. 1 is a side elevational view of a clothes dryer which is exemplary of the various clothes dryers which may be controlled by my improved control system, the view being partially broken away and partially sectionalized to illustrate details of the dryer.
Figure 2:
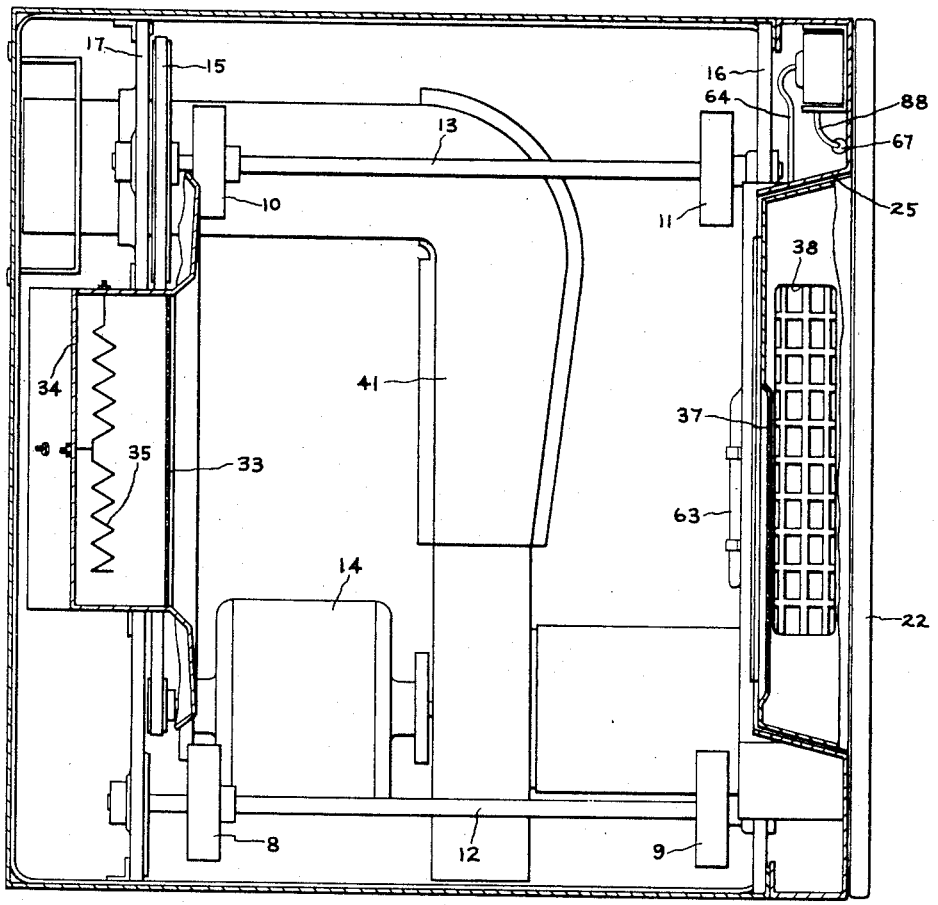
Fig. 2 is a horizontal sectional view of the dryer, with the basket removed and with certain surfaces broken away and partially sectionalized to illustrate further detail.

Referring now to Figs. 1 and 2 I have shown therein a domestic clothes dryer 1 which includes a rotatable open-ended clothes tumbling basket 2. The basket 2 is mounted for rotation about the horizontal axis and is disposed within a suitable outer casing 3 which encloses it on all sides. The basket specifically comprises a cylindrical drum-like member having an outer cylindrical wall 4 and front and rear walls 5 and 6. The outer cylindrical wall 4 is imperforate over its entire length and on its interior surface is provided with a plurality of clothes tumbling ribs. One such rib is shown at 7 in Fig. 1.

The clothes basket is rotatably supported with the casing 3 by means of a plurality of rollers 8, 9, 10 and 11 (see Fig. 2). The rollers 8 and 9 are mounted on a rotatable idler shaft 12 and the roller wheels 10 and 11 are mounted on a power shaft 13. The idler shaft 12 has no driving connection but the power shaft 13 is driven from the main drive motor 14 of the machine by means of a belt and pulley connection 15. As shown, both the drive shaft 13 and the idler shaft 12 are supported adjacent the front and rear of the dryer by means of suitable bearings mounted in front and rear support plates 16 and 17. Being freely supported on the roller wheels, it is apparent that the basket 2 will turn or roll thereon whenever the drive shaft 13 is turned by the motor 14. The ratio of the drive and driven pulleys in the drive 15 is suitably chosen so that the basket is rotated at an appropriate speed to provide a clothes tumbling action for the articles of clothes placed therein.

In order that a stream of heated air may be passed through the basket 2 to dry the clothes being tumbled therein, the basket is provided with suitable apertures in its front and rear walls. Specifically, its front end wall 6 is provided with a central aperture 18 and its rear end wall is provided with a similar aperture 19. The front opening 18 is covered or closed by means of a combination bulkhead generally indicated at 20, which is formed of a number of adjacent members. Specifically the bulkhead 20 is formed of the inner surface 21 of the access door 22 of the machine, a wall 23 of an outlet duct 24 leading from the basket, a door seat 25 for the door 22 and an annular flange 26 mounted on the door seat and the wall of the duct 24. The annular flange 26 it will be noted comprises the periphery of this combination bulkhead 20 and it surrounds the opening 18 in the basket. The access door 22 when open provides for the insertion and removal of clothes from the basket 2.

The rear opening 19 of the basket is likewise closed or covered by a stationary bulkhead. Specifically it is closed by means of a one-piece bulkhead 27 which is supported from the dryer casing by a pair of cross supports 28 and 29. The outer edge of this bulkhead 27, as shown, is defined by a flange 30 which generally surrounds the opening 19.

It will be noted that suitable air seals are provided at both the front and the rear of the basket to prevent air leakage. A sealing member 31 mounted on the stationary flange 26 of the front bulkhead slidably engages the basket front wall 5 so as to prevent leakage into the basket through the opening 18; and a similar sealing member 32 mounted on the flange 30 of the rear bulkhead engages the rear wall 6 to prevent leakage into the basket through the opening 19. These sealing members 31 and 32 in addition to acting as air seals, also act as thrust bearings for the basket 4. In other words by their resilience they hold the basket in its axial position on the rollers 8–11.

In order to dry the clothes being tumbled within the basket, a stream of heated air is introduced into it through the rear bulkhead 27, is passed axially across the basket and is then exhausted through the front bulkhead 20. For introducing the air the rear bulkhead 28 is provided with a screened air inlet opening 33; and mounted behind the bulkhead 27 and leading to this inlet 33 is an air intake duct 34 which has positioned in it an electric heater 35. The intake duct 34 is open at its lower end and the air passes upwardly through it to the opening 33 during the operation of the machine. As the air passes through the duct it is heated by the heater 35 and thus when it flows into the drum through the opening 33, it is at a suitable temperature for drying the clothes. The air incidentally enters the cabinet through a suitable louvered air inlet opening (not shown).

The suction for drawing the air into the basket through the intake duct 34 and the opening 33 is created by means of a centrifugal blower 36 which is driven directly by the drive motor 14. To provide the suction the intake of the blower 36 is connected to the front end of the basket by means of the duct 24 and the door 22. The door 22 has a hollow interior, as shown, and it includes an opening 37 in its inner surface which communicates directly with the front end of the drum. The opening 37 is connected through the hollow interior of the door to a second opening 38 in the bottom of the door, and this opening 38 is in turn connected to the upper end of the duct 24 through an aligned opening 39 in the door seat 25. From the opening 39 in the door seat the duct 24 leads directly to the intake of the blower. With this duct arrangement, the blower applies a suction at the opening 38 which draws air into the basket through the intake duct 34 and the inlet 33. The air so entering the basket is drawn axially across the basket to the opening 38 and then passes downwardly through the door and the duct 24 to the blower. It will be noted that as the air enters the exhaust duct through the opening 38 and 39 it passes through a fine mesh lint trap 40 which is supported by the door seat and which is effective to remove any lint carried by the air. From the blower the air is exhausted from the machine through an outlet duct 41 which extends rearwardly to the back wall of the machine. The back wall is provided with a suitable aperture (not shown) to allow for the escape of the air from the machine.

Figure 3:
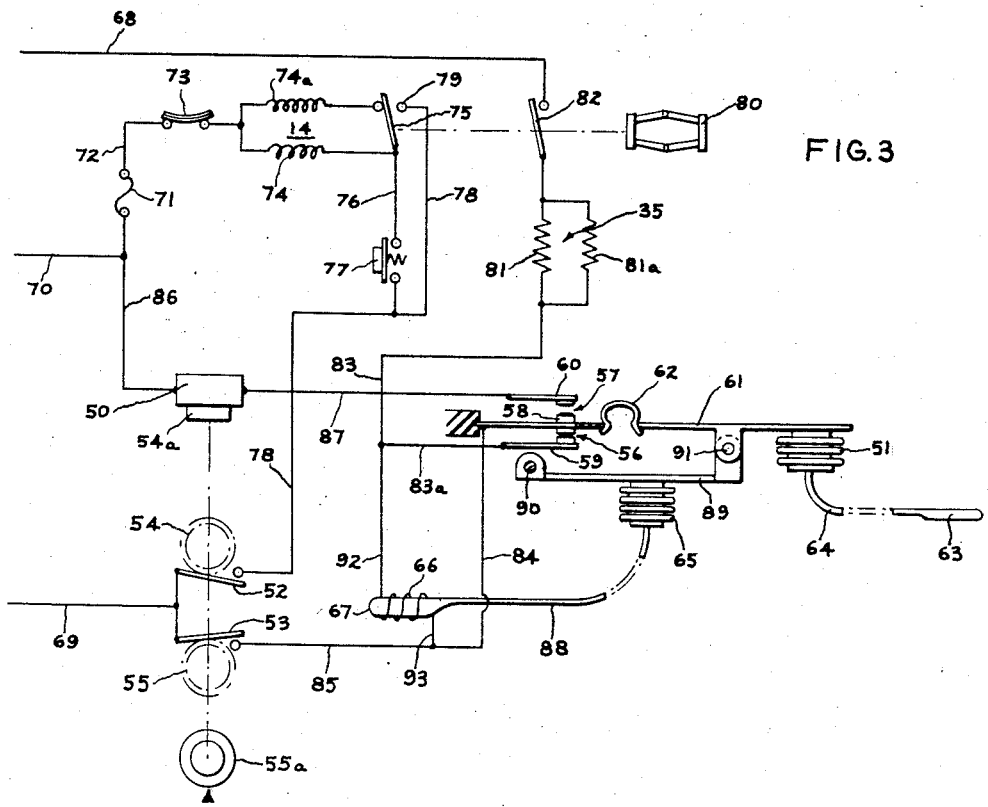
Fig. 3 is a schematic circuit diagram of a preferred embodiment of my improved control system.

The operation of the dryer 1 is controlled by a new and improved control system which embodies my invention in one form thereof. This system is shown in schematic form in the circuit diagram of Fig. 3. As is there shown, the control system includes two principal control means in the form of a timer motor 50 and a control thermostat 51. The timer motor 50, which is preferably of synchronous type, is arranged for operating a pair of switches comprising a drive motor switch 52 and a combined timer motor and a heater switch 53. The switch 52 is specifically operated by a first cam 54 driven by the timer motor through suitable reduction gear means 54a, and the switch 53 is operated by a similarly driven second cam 55. The timer motor and its cams, may be manually adjusted by an operator control dial 55a which is suitably connected to the cam shaft by a one-way clutch (not shown).

The control thermostat 51 like the timer motor 50 operates a pair of switches. Specifically it operates a heater switch 56 and a timer motor switch 57. It will be noted that the switches 56 and 57 share a common movable contact 58 which in its lower position closes the switch 56 and in its upper position closes the switch 57. Alternately stated, the switch 56 comprises the movable contacts 58 and a fixed contact 59 and the switch 57 comprises the movable contact 58 and a fixed contact 60. The thermostat 51, which is shown in its cold position, operates the contact 58 and thus the two switches through a pivoted link 61. This link 61 is engaged at its one end by the thermostat 51 and at its other end is connected to the movable end of the contact member 58 by means of a toggle spring 62. The spring 62 operates in the manner well known to the art to move the contact arm 58 between its upper and lower positions, and vice versa, with a snap action as the adjacent end of the arm 61 is moved upwardly and downwardly.

The thermostat 51, as shown, comprises an expansible, hydraulic filled bellows element. It is controlled by means of a sensing element 63 which is connected to it by a suitable line or tube 64. The bulb 63 as is shown in Figs. 1 and 2 is positioned at the front of the dryer on the bulkhead 20 directly below the air outlet opening 37 from the drum. Thus the bulb 63 is effective to sense the temperature of the exhaust air leaving the drum, which temperature is very close to the actual clothes temperature.

By my invention the relationship between the control thermostat 51 and the switches operated thereby may be varied during the operation of the dryer by means of a second thermostat 65. Specifically in the illustrated embodiment, the relationship is varied by the thermostat 65 moving the pivot point of the link 61 so that a higher or lower temperature is required within the dryer at the bulb 63 for the control thermostat 51 to operate the contacts. The manner in which the pivot point is so moved will be described hereinafter. The auxiliary thermostat 65 by modifying the relationship between the thermostat 51 and the contacts operated thereby is effective to provide two very desirable results. Firstly, it provides an ambient correction so that regardless of any changes in ambient temperatures, the correct drying effect is always provided. And secondly, it causes the operating temperature in the machine to rise toward the end of the drying operation so that a shorter drying time is obtained than has heretofore been possible. To provide this second, raised temperature, reduced time drying effect the thermostat 65 is controlled by means of a heater 66 which is positioned in intimate thermal relationship with its sensing bulb 67. The heater 66 upon its energization causes the thermostat 65 to adjust the link 61 so that a higher temperature is required within the dryer for the control thermostat 51 to open the heater switch 56 and close the timer switch 57. It will be understood, incidentally, that a bimetallic auxiliary thermostat and suitable connections thereto could be used in place of the illustrated hydraulic type thermostat to provide this adjustment of the operating effects of the main control thermostat.

To explain how the thermostat 65 effects the above-mentioned results, it is first desirable that an understanding be had of the basic operation of the system as controlled by the thermostat 51 and the timer motor 50. As shown, the entire control system is energized from a three wire power supply having supply conductors 68 and 69 and a neutral conductor 70. For domestic use the conductors 68 and 69 will normally be connected across a 220 volt power supply with 110 volts appearing between the neutral line 70 and each of these conductors.

The drive motor 14 of the machine is energized between the neutral line 70 and the supply conductor 69. Commencing with the neutral line 70 the circuit extends to the drive motor through a fusible cut-out 71, a conductor 72 and a thermal responsive motor overload protector 73. The motor includes a main winding 74 and a start winding 74a which are connected in parallel through a motor operated centrifugal switch 75 when the machine is at stand still. From the switch 75 the circuit extends through a conductor 76 to a normally open start switch 77, and from the switch 77 it is completed to the supply conductor 69 through a conductor 78 and the timer operated switch 52. Assuming the timer operated switch 52 to be closed, the motor is placed in operation by the operator of the machine closing the switch 77. This places line voltage on both the main winding 74 and the start winding 74a of the motor. The motor therefore commences rotation. As the motor comes up to speed, centrifugal switch 75 is operated from its illustrated position wherein it connects the windings in parallel to a second position wherein it opens the start winding and connects the main winding to another contact 79. The switch 75, as shown, is operated by means of a suitable centrifugal mechanism 80 which is driven directly by the motor 14. The contact 79 is connected directly to the conductor 78 so that the effect of the operation of the switch 75 is to drop the start winding out of the circuit without de-energizing the main winding. The motor then continues in operation on the main winding alone, with that winding being locked in by the switch 75 for so long as the motor rotation continues. The operator may thus release the switch 77 and the motor will continue running until such time as the timer motor 50 opens the switch 52.

When the drive motor 50 comes up to speed, the heater 35 is then energized across the supply conductors 68 and 69. Commencing with the supply conductor 68 the heater circuit extends directly to the two parallel resistors 81 and 81a of the heater through a switch 82 which is operated by the centrifugal mechanism 80. This switch 82 is open whenever the motor is at rest but it is closed as soon as the motor comes up to speed. From the resistors 81 and 81a the heater circuit continues through conductors 83 and 83a to the contacts 59 and 58 of the switch 56 which are normally closed at the start of the drying operation. In other words the thermostat 51, when the exhaust air from the dryer is cold, operates the pivoted arm 61 so as to close the switch 56. From the switch 56 the heater circuit is completed back to the opposite supply conductor 69 through conductors 84 and 85 and the timer switch 53. Thus it will be understood that at the commencement of the drying operation the heating element 35 is energized so as to heat the air being passed through the dryer drum. It will be noted incidentally that for the operator to place the dryer in operation she must set the timer 50 so as to close the switches 52 and 53 in addition to operating the start button 77.

The timer motor 50 unlike the heater 35 and the drive motor 14 is not energized at the start of the drying operation. Rather it is energized only when the exhaust air temperature rises to a point sufficient to cause the thermostat 51 to open the switch 56 and close the switch 57. The timer motor 50, as shown, is energized between the neutral conductor 70 and the supply conductor 69. Commencing with the conductor 70 the timer motor circuit extends directly to the timer motor through the conductor 86, and then continues from the other side of the timer motor to the fixed contact 60 of the switch 57 through a conductor 87. From the opposite contact 58 of the switch 57 it is completed to the supply conductor 69 through the conductors 84, 85 and the timer switch 53. With the switch 57 being so connected serially in the circuit it is thus necessary that it be closed, and the switch 56 concurrently opened, by the thermostat 50 in order for the timer motor to be energized.

Once the exhaust temperature has reached a point wherein the thermostat 51 trips the contact 58 opening the switch 56 and closing the switch 57, the timer motor 50 then begins to run and the heater 35 is de-energized. The timer motor in fact continues in operation until such time as the exhaust temperature falls low enough to cause resetting of the thermostat 51 again closing the switch 56 and opening the switch 57. If a load of light synthetics is being dried, the timer will be set so that it runs for only a brief period before opening the switches 52 and 53. Thus the drying operation will ordinarily be terminated before the thermostat ever resets to its cold position. This is desirable since the light synthetic fabrics are ordinarily practically dry when the thermostat trips the first time and thereby need little additional drying time. In fact, the temperature at which the thermostat 51 opens the switch 56 and closes the switch 57 is selected primarily with that purpose in mind. In other words the thermostat 51 is so arranged and calibrated that it will operate the contacts at the exhaust air temperature which indicates that the synthetic fabrics are dried.

With the thermostat being calibrated in this manner, it will be realized that the medium and heavy fabrics will not be dried when the thermostat trips the first time. Thus ordinarily some additional drying time will be needed for them. In other words the timer motor must be set so that it does not terminate the drying operation immediately. Rather it is set to run for varying lengths of time depending upon the exact composition of the load so that the heater and the timer motor may be cycled on and off inversely one or more times by the thermostat 51. For both types of loads sufficient additional drying time is ordinarily needed whereby several cycles of the timer motor and heater will be needed.

One important aspect of my invention is directed to shortening this additional drying time which is needed for completing the drying of these loads of medium and heavy fabrics. To do this I provide means whereby the drying temperature is raised above the original operating point of the thermostat 51 as the inverse cycling of the timer motor and the heater continues. Specifically, I do this by means of the auxiliary thermostatic means 65. In my preferred embodiment the thermostat 65 comprises an expansible bellows member which is operated from the sensing bulb 66 by means of a suitable hydraulic line 88, and in order to change the exhaust air temperature, it modifies the operating relationship between the control thermostat 51 and the contact 58 so that a higher exhaust temperature is required before the thermostat 51 can operate the contact 58 to open switch 56 and close switch 57. In my preferred embodiment the auxiliary thermostat 65 does this by means of link 89 which it engages intermediate its ends. The link 89 is pivoted at its one end 90 to a stationary support and at its other end 91 it is pivoted to link 61 by a pivot 91. Specifically, the link 89 carries the link 61 by means of this pivot 91. With the link 89 so carrying the link 61 it will be seen that upon the expansion of the bellows 65 the relationship between the thermostat 51 and the contact 58 will be changed. Specifically, as the bellows 65 expands the position of the pivot point of the link 61 will be changed so that the thermostat 51 will have to expand further to operate the contact 58 from engagement with the contact 59 to engagement with the contact 60. In other words the temperature within the dryer will have to rise to a higher level in order to cause opening of the heater circuit and closing of the timer motor circuit. A higher drying temperature will thereby be provided.

In order to effect this result I connect the auxiliary thermostat heater 66 so that the thermostatic bulb 67 is heated during this latter period of the drying operation. The heater 66 in my preferred embodiment is connected across the switch 56 by means of the conductors 92 and 93. Thus whenever the switch 56 is closed, as it is throughout the entire early portion of the drying cycle, the heater 66 is not energized. However, when the switch 56 is opened and the switch 57 closed by the control thermostat 51, the auxiliary heater thermostat 66 is then connected in series with the main heater 35 across the supply conductors 68 and 69. The main heater 35 is of a much lower resistance than the auxiliary heater 66, for example in one embodiment the heater 35 being about of 10 ohms and the heater 66 being of about 4,000 ohms, so that upon this condition the heater 66 is energized to produce heat whereas the heater 35 produces very little heat. Upon this energizing of the heater 66 the bulb 67 is heated so as to cause expansion of the thermostat 65. This in turn causes the pivot point of the lever 61 to be shifted so that the thermostat 51 must expand further to operate the contact 58 to its position closing the switch 57 and opening the switch 56. In other words a higher temperature is required within the dryer before the heater can again be turned off and the timer motor turned on.

Since the heater 66 is energized each time the timer motor is energized, the longer the timer is set to run, the more the thermostat 65 will be expanded. In my preferred embodiment the thermal time constant of heater 66 and bulb 67 is arranged to be about seven minutes so that a considerable portion of the temperature rise of bulb 67 is cumulative from cycle to cycle. In other words the heater 67 and the bulb 66 contain enough thermal inertia that the bulb does not cool off to its initial temperature each time the heater is de-energized. Thus, as the timer motor is cycled on and off, the thermostat 65 continues, in effect, to raise the temperature required for the main control thermostat 51 to operate the switches 56 and 57. A gradual temperature rise is therefore created in the dryer and as the drying operation continues, the drying temperature reaches some desired high value which results in a greatly reduced drying time. (Incidentally by the term "thermal time constant" as used above, I mean that in my preferred system the relationships of heat storage and dissipation are such that about seven minutes would be needed with the heater 67 continuously energized for the bulb 66 to reach approximately 67% of its ultimate temperature change.)

Figure 4:
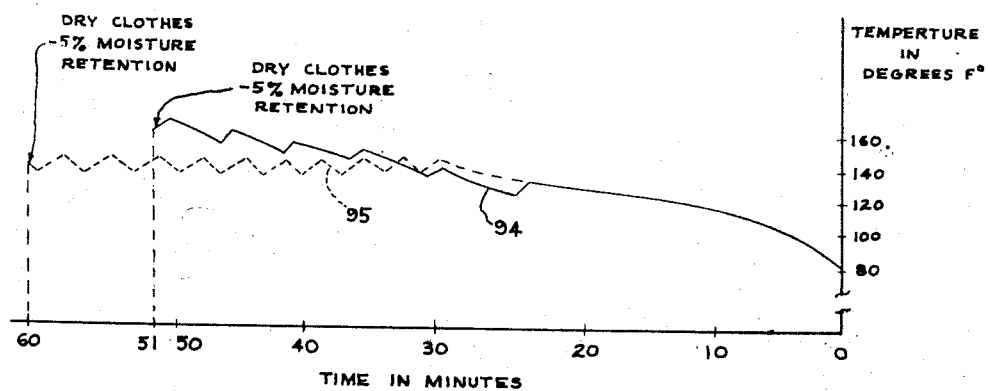
Fig. 4 is a chart showing the results which may be obtained from my improved control system as compared with a system not embodying my invention.

The reduced drying time resulting from my invention may be clearly seen by reference to the diagram of Fig. 4 wherein the solid line 94 represents a typical drying operation provided by my new and improved control system, whereas the dotted line 95 illustrates a typical operation produced by the basic control system not embodying my improvement. The illustrated curves are for a heavy load such as shag rugs, and it will be noted in the curve 94 that after the original tripping of the thermostat, the temperature within the dryer rises as the heater and timer motor cycle on and off inversely. The zig-zag portion of the curve, of course, represents the period during which the inverse cycling is occurring. With the basic circuit, however, as shown by the dotted curve 95 there is no increase of the drying temperature during the inverse cycling period. Rather the drying temperature remains relatively constant. As a result the clothes are dried much faster with my new and improved method than with the system not embodying my invention. With the particular load here shown the drying is finished in 51 minutes with my improved system whereas a full 60 minutes are required with the other system. This constitutes a 15% reduction in drying time, which is of course very advantageous. The clothes are considered dry incidentally when their moisture retention is 5% by weight.

In my preferred embodiment the thermostat 65 provides another desirable function in addition to providing the shortened drying time. Specifically, it provides an ambient compensation whereby the same drying effect is provided for all ambient temperatures of the intake air to the dryer. As is shown in Figs. 1 and 2 the sensing bulb 67 of the thermostat 65 is mounted within the dryer cabinet at the front thereof in a position where it is effective to sense the ambient temperature. In other words it senses the temperature of the air being drawn into the cabinet prior to its entry into the heater and drum. As a result the thermostat bellows 65 expands and contracts with the ambient temperature thus moving the pivot point 91 of the control link 61. This movement of the control link provides a compensation whereby the control thermostat 51 must expand further at high ambient temperatures than at low ambient temperatures to operate the contacts, that is, to turn off the heater and energize the timer motor. As a result the desired increment over ambient is obtained in the exhaust air temperature, no matter what the ambient temperature may be within the expected range for domestic use, for the thermostat 51 to turn off the heater and start the timer motor. Thus the same drying effect is provided no matter what the ambient temperature may be.

While in accordance with the patent statutes I have described what at present is considered to be the preferred embodiment of my invention it will be obvious to those skilled in the art that various changes and modifications may be made therein without departing from the invention, and it is, therefore, aimed in the appended claims to cover all such equivalent variations as fall within the true spirit and scope of the invention.

What I claim as new and desire to secure by Letters Patent of the United is:

1. In a clothes dryer having clothes tumbling means and a heater for supplying heat for drying the clothes being tumbled, a control system for controlling the operation of the drier comprising a timer motor, a control thermostat responsive to the temperature within the dryer, a heater switch and a timer motor switch both operated by said control thermostat and controlling respectively the operation of said heater and said timer motor during the drying operation, said control thermostat opening said heater switch and closing said timer switch at a relatively high temperature within said dryer and closing said heater switch and opening said timer switch at a lower temperature within said dryer, whereby said heater and said timer motor are cycled inversely in response to the dryer temperature, auxiliary thermostatic means arranged to modify the actuation of said switches by said control thermostat, heating means arranged for heating said auxiliary thermostatic means, a circuit controlled by one of said timer motor and heater switches for energizing said heating means concurrently with said timer motor, whereby the longer the timer motor is in operation the more modified is the actuation of said switches by said control thermostat and the higher is the temperature maintained within said dryer, and switch means operated by said timer motor for opening the heater and timer motor circuits to terminate the dryer operation.

2. In a clothes dryer having clothes tumbling means, a heater and air moving means for circulating a stream of air over said heater and through said tumbling means for drying the clothes therein, a control system for controlling the operation of the dryer comprising a timer motor, a control thermostat responsive to the temperature within the dryer, a heater switch and a timer motor switch both operated by said thermostat and controlling respectively the operation of said heater and said timer motor during the drying operation, said control thermostat opening said heater switch and closing said timer switch at a relatively high temperature within said dryer and closing said heater switch and opening said timer switch at a lower temperature within said dryer, whereby said heater and said timer motor are cycled inversely in response to the dryer temperature, auxiliary thermostatic means positioned to respond to the ambient temperature and arranged to modify the actuation of said switches by said control thermostat in accordance with the ambient temperature, heating means arranged for heating said auxiliary thermostatic means thereby further to control said thermostatic means to modify the actuation of said switches by said control thermostat, a circuit controlled by one of said timer motor and heater switches for energizing said heating means concurrently with said timer motor, whereby the longer the timer motor operates the more modified is the actuation of said switches by said control thermostat and the higher is the final temperature produced within said dryer, and switch means operated by said timer motor for opening the heater and timer motor circuits to terminate the dryer operation.

3. In a clothes dryer having clothes tumbling means, a heater, and air moving means for circulating a stream of air over said heater and through said tumbling means for drying the clothes therein, a control system for controlling the operation of the dryer comprising a timer motor, a control thermostat responsive to the temperature within the dryer, a heater switch and a timer motor switch both operated by said control thermostat and controlling respectively the operation of said heater and said timer motor during the drying operation, said control thermostat opening said heater switch and closing said timer switch at a relatively high temperature within said dryer and closing said heater switch and opening said timer switch at a lower temperature within said dryer, whereby said heater and said timer motor are cycled inversely in response to the dryer temperature, auxiliary thermostatic means positioned to respond to the ambient temperature and arranged to modify the actuation of said switches by said control thermostat in accordance with the ambient temperature, said auxiliary thermostatic means being arranged to increase and decrease the temperature at which said control thermostat opens said heater switch and closes said timer switch with increases and decreases respectively in the ambient temperature, thereby to provide the same drying effect at all ambient temperatures, and switch means operated by said timer motor for opening the heater and timer motor circuits to terminate the dryer operation.

4. In a clothes dryer having clothes tumbling means, a heater, and air moving means for circulating a stream of air over said heater and through said tumbling means for drying the clothes therein, a control system for controlling the operation of the dryer comprising a timer motor, a control thermostat responsive to the temperature within the dryer, a heater switch and a timer motor switch for controlling respectively the operation of said heater and said timer motor during the drying operation, linkage means actuated by said control thermostat for operating both said heater switch and said timer motor switch, said control thermostat opening said heater switch and closing said timer switch at a relatively high temperature within said dryer and closing said heater switch and opening said timer switch at a lower temperature within said dryer, whereby said heater and said timer motor are cycled inversely in response to the dryer temperature, auxiliary thermostatic means arranged to adjust said linkage to modify the actuation of said switches by said control thermostat, heating means arranged for heating said auxiliary thermostatic means, a circuit controlled by one of said timer motor and heater switches for energizing said heating means concurrently with said timer motor, whereby the longer the timer motor operates the higher is the temperature maintained within said dryer by said control thermostat, and switch means operated by said timer motor for opening the heater and timer motor circuits to terminate the dryer operation.

5. In a clothes dryer having clothes tumbling basket, a heater, air moving means for circulating a stream of air over said heater and through said basket for drying the clothes therein, and an outer enclosing cabinet, a control system for controlling the operation of the dryer comprising a timer motor, a control thermostat responsive to the temperature of the exhaust air leaving said basket, a heater switch and a timer motor switch both operated by said control thermostat and controlling respectively the operation of said heater and said timer motor during the drying operation, said control thermostat opening said heater switch and closing said timer switch at a relatively high exhaust temperature and closing said heater switch and opening said timer switch at a lower exhaust temperature, whereby said heater and said timer motor are cycled inversely in response to the exhaust temperature, auxiliary thermostatic means positioned to respond with the ambient temperature within said cabinet and arranged to modify the actuation of said switches by said control thermostat in accordance with the ambient temperature, heating means arranged for heating said auxiliary thermostatic means thereby further to control said auxiliary thermostatic means to raise the exhaust temperature at which said switches are operated by said control thermostat, a circuit controlled by one of said timer motor and heater switches for energizing said heating means concurrently with said timer motor, whereby the longer the timer motor operates the higher is the exhaust temperature maintained by said control thermostat, and switch means operated by said timer motor for opening the heater and timer motor circuits to terminate the dryer operation.

References Cited in the file of this patent
UNITED STATES PATENTS

| | | |
|---|---|---|
| 2,328,974 | Guler | Sept. 7, 1943 |
| 2,463,934 | Allen | Mar. 8, 1949 |
| 2,505,041 | Gorsuch | Apr. 25, 1950 |
| 2,611,850 | Walton | Sept. 23, 1952 |
| 2,743,532 | Steward | May 1, 1956 |
| 2,778,575 | Kucera | Jan. 22, 1957 |